United States Patent
Mu

(10) Patent No.: US 12,294,987 B2
(45) Date of Patent: May 6, 2025

(54) METHOD AND APPARATUS FOR CONTROLLING PRE-CONFIGURED RESOURCE, AND METHOD AND APPARATUS FOR DATA TRANSMISSION

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 451 days.

(21) Appl. No.: 17/635,569

(22) PCT Filed: Aug. 16, 2019

(86) PCT No.: PCT/CN2019/101182
§ 371 (c)(1),
(2) Date: Feb. 15, 2022

(87) PCT Pub. No.: WO2021/031009
PCT Pub. Date: Feb. 25, 2021

(65) Prior Publication Data
US 2022/0322382 A1    Oct. 6, 2022

(51) Int. Cl.
*H04W 72/1263* (2023.01)
*H04L 1/08* (2006.01)
(Continued)

(52) U.S. Cl.
CPC ........... *H04W 72/1263* (2013.01); *H04L 1/08* (2013.01); *H04L 5/0053* (2013.01); *H04W 28/26* (2013.01); *H04W 76/30* (2018.02)

(58) Field of Classification Search
CPC . H04W 72/1263; H04W 28/26; H04W 76/30; H04L 1/08; H04L 5/0053
See application file for complete search history.

(56) References Cited

FOREIGN PATENT DOCUMENTS

EP    3849271 A1 *   7/2021   ........... H04L 1/1671
EP    3876627 A1 *   9/2021   ........ H04W 52/0216

OTHER PUBLICATIONS

Samsung, "Discussion on transmission in preconfigured UL resources for NB-IOT, R1-1812947, 3GPP TSG RAN WG1 Meeting #95, Nov. 12-16, 2018" (Year: 2018).*

(Continued)

*Primary Examiner* — Huy D Vu
*Assistant Examiner* — Robert Ma
(74) *Attorney, Agent, or Firm* — Cozen O'Connor

(57) ABSTRACT

A method and apparatus for controlling a preconfigured resource, and a method and an apparatus for data transmission. The method for controlling the preconfigured resource includes: determining a first condition, wherein the first condition includes the maximum number of consecutive transmission occasions that a terminal is allowed to skip; and releasing a preconfigured resource for the terminal in response to not detecting predetermined information sent by the terminal during N consecutive transmission occasions. N is the maximum number of consecutive transmission occasions that the terminal is allowed to skip. When the terminal in the grant-free scheduling state is in a disconnected state and needs to transmit data, the data is transmitted at a specified transmission occasion on a resource preconfigured by a network device for the terminal.

8 Claims, 8 Drawing Sheets

(51) Int. Cl.
*H04L 5/00* (2006.01)
*H04W 28/26* (2009.01)
*H04W 76/30* (2018.01)

(56) References Cited

OTHER PUBLICATIONS

Sierra Wireless, "LTE-M Pre-Configured UL Resources Design Consideration, R1-1812724, 3GPP TSG RAN WG1 Meeting #95, Nov. 12-16, 2018" (Year: 2018).*
European Patent Application No. 19941993.8, Search and Opinion dated Jul. 27, 2022, 11 pages.
Indian Patent Application No. 202247013823, Office Action dated Aug. 31, 2022, 7 pages.
Samsung "Discussion on transmission in preconfigured UL resources for NB-IOT" 3GPP TSG RAN WG1 Meeting #95, R-1812947, Nov. 2018, 6 pages.
Sierra Wireless "LTE-M Pre-configured UL Resources Design Considerations" 3GPP TSG RAN WG1 Meeting #95, R1-1812724, Nov. 2018, 11 pages.
Sierra Wireless "NB-IOT Pre-configured UL Resources Design Considerations" 3GPP TSG RAN WG1 Meeting #98, R1-1908187, Aug. 2019, 13 pages.
Samsung: "Discussion on transmission in preconfigured UL resources for MTC", R1-1812940 3GPP TSG RAN WG1 Meeting #95, Nov. 2018; Spokane, USA, 6 pages.
Samsung: "Discussion on transmission in preconfigured UL resources for NB-IOT", R1-1812947 3GPP TSG RAN WG1 Meeting #95; Nov. 2018; Spokane, USA; 6 pages.
PCT/CN2019/101182 International Search Report dated May 18, 2020, 2 pages.

* cited by examiner

METHOD AND APPARATUS FOR CONTROLLING PRE-CONFIGURED RESOURCE, AND METHOD AND APPARATUS FOR DATA TRANSMISSION

CROSS-REFERENCE TO RELATED APPLICATION

This application is the US national phase application of International Application No. PCT/CN2019/101182, filed on Aug. 16, 2019, the entire contents of which are incorporated herein by reference.

TECHNICAL FIELD

The disclosure relates to the field of communication technology, in particular to a method and an apparatus for controlling a preconfigured resource, a method and an apparatus for data transmission, and a storage medium.

BACKGROUND

Recently, Internet of thing (IoT) technologies such as Narrow band Internet of thing (NB-IoT) and Machine Type Communication (MTC) have developed vigorously and have been applied in various fields, which bring great conveniences to human life.

In the related art, grant-free uplink scheduling is introduced in the IoT communication scenario. In the grant-free uplink scheduling, a network device preconfigures resources used by the terminal for transmission, such as resource allocation, and modulation and demodulation modes. When the terminal needs to transmit data, it is unnecessary to perform random access and receive uplink scheduling grant, uplink transmission can be performed on the resources configured in advance, thereby reducing signaling overhead and avoiding power waste. Although the network device preconfigures the resources for the transmission of the terminal, when there is no data to be sent, the terminal can skip this transmission and enter a dormant state, so as to achieve the purpose of power saving.

However, when the terminal is required to perform random access again due to channel state change or to reselect a cell to re-access to the network, the terminal will skip the current transmission, and the network device needs to release the preconfigured resources. However, the network device cannot identify whether the terminal skips the current transmission due to no data transmission requirement or the channel state change, and the network device cannot determine whether the preconfigured resources need to be reserved.

SUMMARY

According to a first aspect of the disclosure, a method for controlling a preconfigured resource is provided, which is applied to a network device, and includes: determining a first condition, in which the first condition includes a maximum number of consecutive transmission occasions that a terminal is allowed to skip; releasing a preconfigured resource for the terminal in response to not detecting predetermined information sent by the terminal during N consecutive transmission occasions. Here, N is the maximum number of consecutive transmission occasions that the terminal is allowed to skip. When the terminal in the grant-free scheduling state is in a disconnected state and needs to transmit data, that data is transmitted at a specified transmission occasion on the resource preconfigured by the network device for the terminal.

According to a second aspect of the disclosure, a method for data transmission is provided, which is applied to a terminal and includes: determining a first condition, wherein the first condition includes a maximum number of consecutive transmission occasions that a terminal is allowed to skip; and transmitting data according to the first condition. Here, when the terminal in the grant-free scheduling state is in a disconnected state and needs to transmit data, the data is transmitted at a specified transmission occasion on the resource preconfigured by the network device for the terminal.

According to a third aspect of the disclosure, a network device is provided. The network device includes: a processor and a memory configured to store instructions executable by the processor. The processor is configured to implement the method for controlling a preconfigured resource according to the first aspect.

According to a fourth aspect of embodiments of the disclosure, a non-transitory computer-readable storage medium is provided. When instructions in the storage medium are executed by a processor of a network device, the network device is enabled to implement the method for controlling a preconfigure resource according to the first aspect or any implementation of the first aspect.

According to a fifth aspect of embodiments of the disclosure, a terminal is provided. The terminal includes: a processor and a memory configured to store instructions executable by the processor. The processor is configured to implement the method for data transmission according to the second aspect.

According to a sixth aspect of embodiments of the disclosure, a non-transitory computer-readable storage medium is provided. When instructions in the storage medium are executed by a processor of a mobile terminal, the mobile terminal is enabled to implement the method for data transmission according to the second aspect or any implementation of the second aspect.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
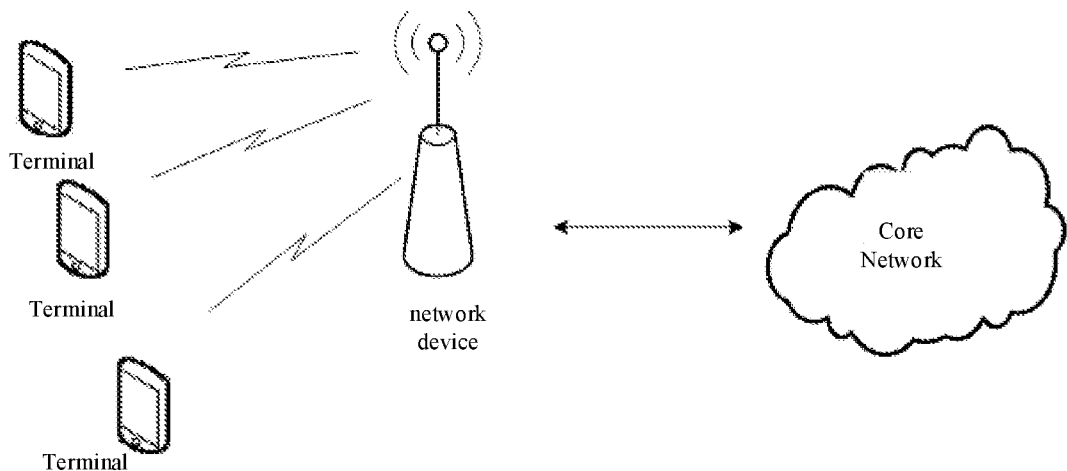
FIG. 1 is a schematic diagram of a wireless communication system according to some exemplary embodiments.

The method provided by the disclosure can be applied to a wireless communication system shown in FIG. 1. As shown in FIG. 1, a terminal accesses the network through a network device such as a base station, and the network device and a core network complete backhaul and forwarding delivery of data for various communication services.

It can be further understood that the wireless communication system is a network that provides the wireless communication function. The wireless communication system can use different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), and carrier sense multiple access with collision avoidance. According to different network capacity, speed, delay and other factors, the network can be divided into 2G (generation) network, 3G network, 4G network or future evolution networks, such as 5G network. 5G network can also be called a New Radio (NR) network. For the convenience of description, the wireless communication network is sometimes referred to as a network or a system for short in this disclosure. The network in the disclosure may include a radio access network (RAN) and a core network (CN). The network includes a network device, and the network device may be, for example, a wireless access network node, a core network device, an IoT platform, an IoT application server, and the like. The wireless access network node may also be referred to as a base station. The network can provide the terminal with network service through the network device, and different operators can provide the terminal with different network services, that is, different operators correspond to different operator networks.

The terminal may also be referred to as a user equipment (UE), a mobile station (MS), and a mobile terminal (MT), which is a kind of device through which voice and/or data connectivity is provided to the user. For example, the terminal may be a handheld device or a vehicle device having a wireless connection function. At present, the terminal may be a mobile phone, a pocket personal computer (PPC), a handheld computer, a personal digital assistant (PDA), a notebook computer, a tablet computer, a wearable device, or a vehicle device. In the disclosure, the terminal may be a device with an NB-IoT chip inserted.

Figure 2:
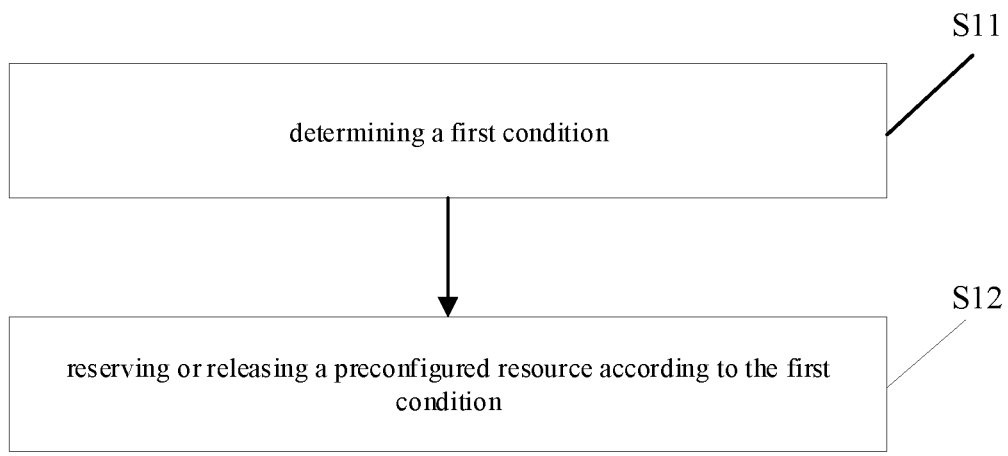
FIG. 2 is a flowchart of a method for controlling a preconfigured resource according to an exemplary embodiment.

In the related art, when the terminal and the network device perform data transmission, if the data amount of each data transmission is relatively small, in order to reduce the signaling overhead in the random access process and the uplink scheduling grant process, the grant-free uplink scheduling is introduced. FIG. 2 is a schematic diagram of data transmission in the grant-free uplink scheduling process. As shown in FIG. 2, in the grant-free uplink scheduling, the network device preconfigures the resources used by the terminal for transmission, such as resource allocation, modulation and demodulation modes, and the like. When the terminal needs to transmit data, it is unnecessary to perform random access and receive uplink scheduling grant, and uplink transmission is performed on the resource configured in advance, thereby reducing signaling overhead and avoiding power waste.

In the related art, in the grant-free uplink scheduling, if the terminal has no data to send, or random access needs to be re-performed due to channel state change, or a cell needs to be re-selected to re-access to the network due to channel state change, the current transmission can be skipped to achieve the purpose of saving power. However, when random access needs to be re-performed or a cell needs to be re-selected to re-access to the network due to channel state change, the terminal skips the current transmission, and the network device needs to release the preconfigured resource. When the terminal has no data transmission requirements, the network device needs to reserve the preconfigured resource. However, the network device cannot identify whether the current transmission is skipped because there is no data transmission requirement or channel state change, and further the network device cannot determine whether to reserve or release the preconfigured resource.

In view of this, the disclosure provides a method for controlling a preconfigured resource. In the method for controlling a preconfigured resource, a condition for controlling reserving or releasing the preconfigured resource is preset, based on which, the reason why the terminal skips this transmission is clear, so as to determine whether to reserve or release the preconfigured resource.

In the disclosure, for the convenience of description, the condition for controlling reserving or releasing the preconfigured resource is referred to as a first condition.

FIG. 2 is a flowchart of a method for controlling a preconfigured resource according to an exemplary embodiment. As shown in FIG. 2, the method for controlling a preconfigured resource is applied in a network device, and the method includes the following steps.

In step S11, a first condition is determined.

In step S12, a preconfigured resource is reserved or released according to the first condition.

In the disclosure, the first condition may be a rule agreed between the network device and the terminal, and the network device determines whether to reserve the preconfigured resource or release the preconfigured resource according to the rule.

For example, the first condition in the disclosure may be a limit condition for the number of transmission occasions the terminal skip during normal data transmission, or the first condition may also be a condition that the terminal initiates random access for link failure, or the first condition may also be a condition that the terminal reports configuration information.

After the network device determines the first condition, it controls reserving or releasing the preconfigured resource according to the first condition.

In the disclosure, on the terminal side, the terminal performs data transmission according to the first condition, so that the network device controls the preconfigured resource according to the first condition.

Figure 3:
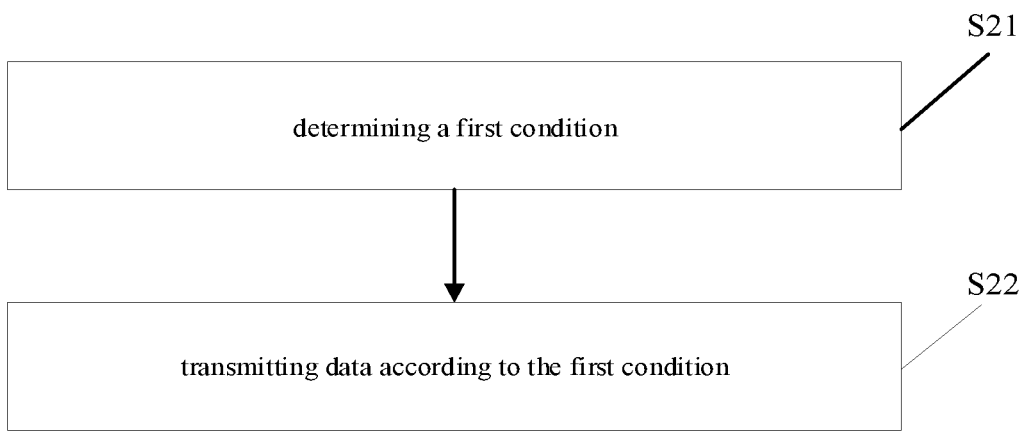
FIG. 3 is a flowchart of a method for data transmission according to an exemplary embodiment.

FIG. 3 is a flowchart of a method for data transmission according to an exemplary embodiment. As shown in FIG. 3, the method for data transmission is applied to a terminal, and the method includes the following steps.

In step S21, a first condition is determined.

In the disclosure, the first condition may be predefined in the terminal, or may be notified to the terminal by the network device through a high layer signaling.

In step S22, data is transmitted according to the first condition.

In the disclosure, data is transmitted according to the first condition, so that the network device controls the preconfigured resource according to the first condition.

The disclosure will hereinafter describe the above embodiments in combination with practical applications.

In an implementation, in the disclosure, the network device and the terminal agree on the maximum number N of consecutive transmission occasions that the terminal is allowed to skip when there is no data transmission requirement, where N is a positive integer. In the disclosure, the maximum number N of consecutive transmission occasions that different terminals are allowed to skip may be the same or different. When the terminal skips no more than N consecutive transmission occasions due to no data transmission requirement, the terminal can send the predetermined information to the network device, in order to prevent the network device from mistaking it as link failure. After receiving the predetermined information, the network device may determine that the reason why the terminal skips transmission is that there is no data transmission requirement, and thus the preconfigured resource is reserved. The terminal cannot send the predetermined information to the network device for link failure, so when the network device does not detect the predetermined information sent by the terminal during the N consecutive transmission occasions, link failure is determined, and the preconfigured resource is released.

Figure 4:
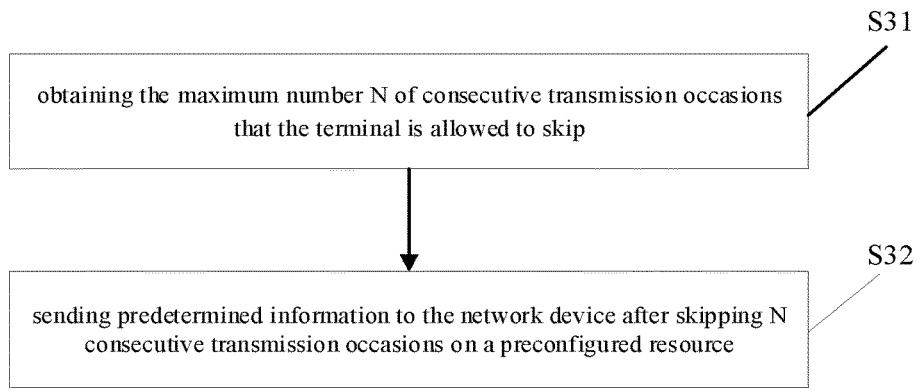
FIG. 4 is a flowchart of a method for controlling a preconfigured resource according to an exemplary embodiment.

FIG. 4 is a flowchart of a method for data transmission according to an exemplary embodiment. As shown in FIG. 4, the method for data transmission may be applied to a terminal, and the method includes the following steps.

In step S31, the maximum number N of consecutive transmission occasions that the terminal is allowed to skip is obtained.

In the disclosure, the maximum number N of consecutive transmission occasions that the terminal is allowed to skip is predefined or sent by the network device based on a high layer signaling.

In step S32, after skipping N consecutive transmission occasions on the preconfigured resource, the predetermined information is sent to the network device.

In the disclosure, after the terminal skips no more than N consecutive transmission occasions, it still needs to wake up even if there is no data transmission requirement, and send the predetermined information to the network device. The content of the predetermined information may be content pre-agreed between the terminal and the network device, for example, data that needs to be transmitted by the terminal. It can be understood that, if there is data transmission requirement, the terminal can directly transmit data to the network device according to the related art.

Figure 5:
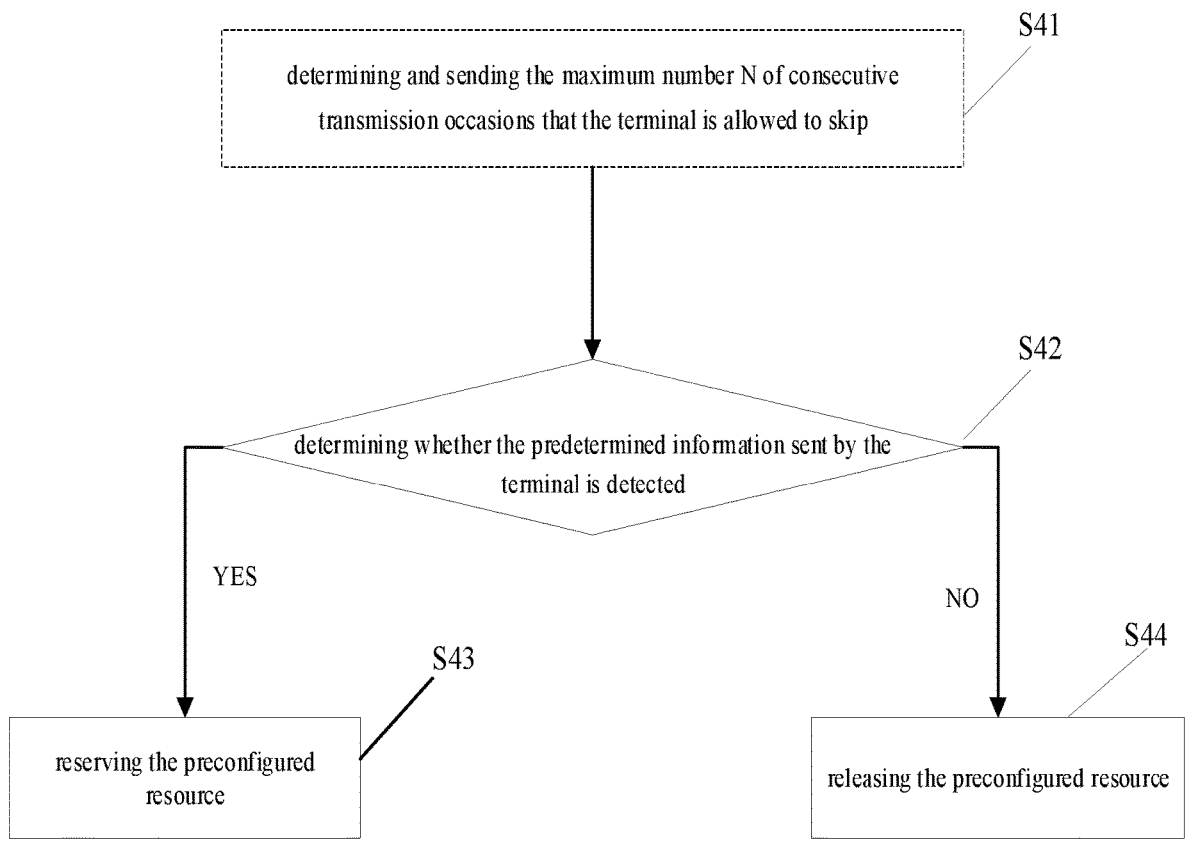
FIG. 5 is a flowchart of a method for data transmission according to an exemplary embodiment.

FIG. 5 is a flowchart of a method for controlling a preconfigured resource according to an exemplary embodiment. As shown in FIG. 5, the method for controlling a preconfigured resource is applied to a network device, and the method includes the following steps.

In step S41, the maximum number N of consecutive transmission occasions that the terminal is allowed to skip is determined and sent.

It can be understood that, if the maximum number N of consecutive transmission occasions that the terminal is allowed to skip is configured to the terminal in a predefined manner, step S41 can be omitted.

In step S42, the predetermined information sent by the terminal is detected at the transmission occasion when the terminal transmits data. If the predetermined information sent by the terminal is detected after the terminal skips no more than N consecutive transmission occasions, step S43 is executed. If the predetermined information sent by the terminal is not detected during the N consecutive transmission occasions, step S44 is executed.

In step S43, the preconfigured resource is reserved.

In the disclosure, if the network device detects the predetermined information sent by the terminal after the terminal skips no more than N consecutive transmission occasions, it can be determined that the terminal skips data transmission occasions normally, and the preconfigured resource can be reserved without releasing the preconfigured resource.

In step S44, the preconfigured resource is released.

In the disclosure, if the network device does not detect the predetermined information sent by the terminal or the data sent by the terminal during N consecutive transmission occasions, it can be determined that the link through which the terminal transmits data is likely to fail, and at this time, the preconfigured resource for the terminal may be released.

In another implementation, in the disclosure, the condition that the terminal initiates random access for link failure is limited, so that the network device can determine link failure of the terminal to transmit data based on the limited condition, and then the preconfigured resource for the terminal is released.

When the network device does not normally receive the data sent by the terminal, the network device will send a negative acknowledgement (NACK) HARQ feedback to the user, and allocate retransmission resource. When the terminal does not correctly receive the HARQ feedback and/or retransmission resource, the random access is initiated, and at this time, when the network device does not detect data on the allocated retransmission resource, link failure can then be determined and the preconfigured resource can be released. Alternatively, when the terminal correctly receives the HARQ feedback and the retransmission resource, but still fails to transmit correctly after repeated retransmissions on the retransmission resource, random access may be initiated, and at this time, the network device can release the preconfigured resource. In the disclosure, the first condition includes the condition that the terminal initiates random access for link failure. The condition that the terminal initiates random access for link failure includes that the terminal initiates random access in response to not receiving negative acknowledgement feedback and/or retransmission resource. Alternatively, the condition that the terminal initiates random access for link failure includes initiating random access in response to that the terminal receives negative acknowledgement feedback and retransmission resource, and retransmission of data fails on M consecutive retransmission resources, where M is a positive integer.

Figure 6:
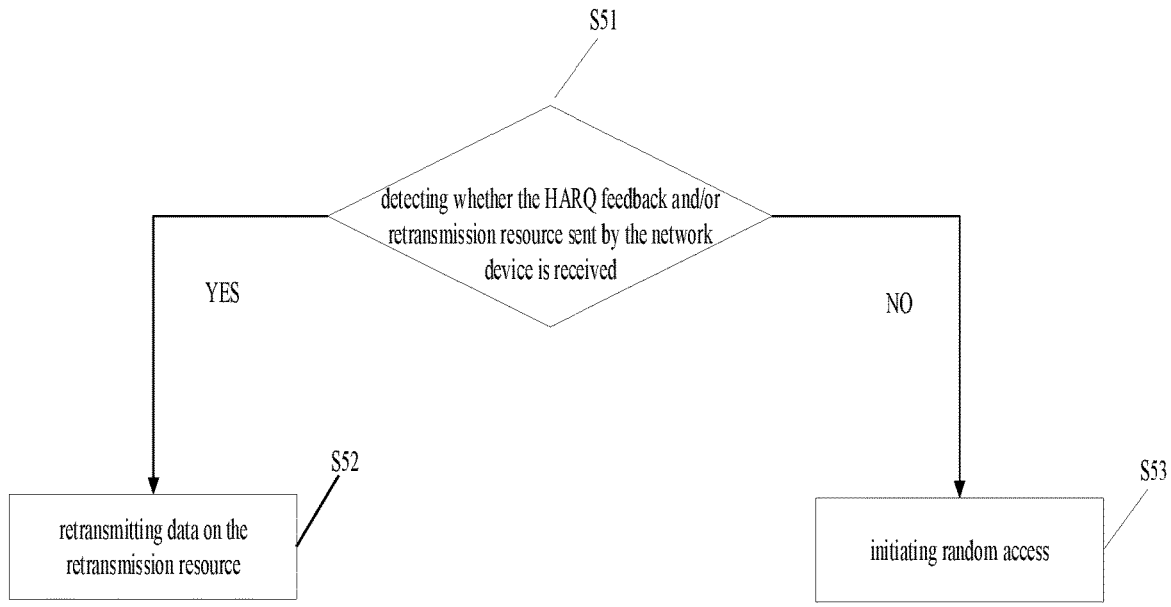
FIG. 6 is a flowchart of a method for controlling a preconfigured resource according to an exemplary embodiment.

FIG. 6 is a flowchart of a method for data transmission according to an exemplary embodiment. As shown in FIG. 6, the method for data transmission may be applied to a terminal, and the method includes the following steps.

In step S51, it is detected whether the negative acknowledgement feedback and retransmission resource sent by the network device are received.

In the disclosure, if the terminal does not receive the HARQ feedback and/or retransmission resource sent by the network device, step S53 is executed to initiate random access. If the terminal correctly receives the HARQ feedback and retransmission resource sent by the network device, step S52 is executed.

In step S52, data is retransmitted on the retransmission resource. In the disclosure, if the terminal fails to retransmit data for M consecutive times on the retransmission resource, step S53 is executed to initiate random access.

In step S53, random access is initiated.

Figure 7:
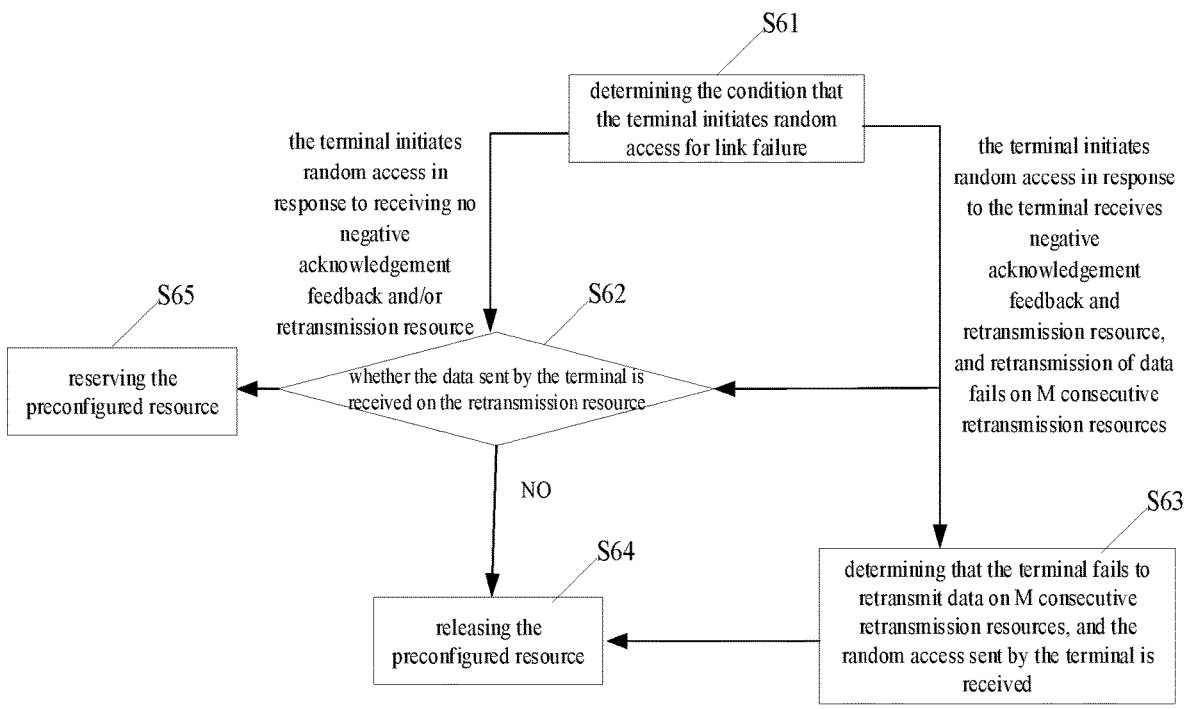
FIG. 7 is a flowchart of a method for data transmission according to an exemplary embodiment.

FIG. 7 is a flowchart of a method for controlling a preconfigured resource according to an exemplary embodiment. As shown in FIG. 7, the method for controlling a preconfigured resource is applied to a network device, and the method includes the following steps.

In step S61, the condition that the terminal initiates random access for link failure is determined.

If the condition that the terminal initiates random access for link failure includes initiating random access by the terminal in response to not receiving negative acknowledgement feedback and/or retransmission resource, step S62 is executed. If the condition that the terminal initiates random access for link failure includes initiating random access in response to that the terminal receives negative acknowledgement feedback and retransmission resource, and retransmission of data fails on M consecutive retransmission resources, step S63 is executed.

In step S62, the data sent by the terminal is detected on the retransmission resource.

In the disclosure, if the data sent by the terminal is not detected on the retransmission resource, step S64 is executed.

In step S63, it is determined that the terminal fails to retransmit data on the retransmission resource for M consecutive times, and then step S64 is executed.

In step S64, the preconfigured resource is released.

In the disclosure, if the data sent by the terminal is detected by the network device on the retransmission resource, step S65 is executed.

In step S65, the preconfigured resource is reserved.

In yet another implementation, in the disclosure, for the terminal in the grant-free scheduling state, in the case of randomly accessing the network for channel quality change, the condition for reporting the current state of the terminal is set. When the terminal reports the current state, it can report the configuration information according to the change of the serving cell. For example, the cell randomly accessed by the terminal in the grant-free scheduling state is the same as the original serving cell, and the terminal in the grant-free scheduling state sends the grant-free scheduling state information. The network device releases the preconfigured resource in response to receiving the grant-free scheduling state information sent by the terminal in the grant-free scheduling state. For another example, the cell randomly accessed by the terminal in the grant-free scheduling state is different from the original serving cell, the terminal in the grant-free scheduling state sends the identity information of the original serving cell, and the current serving cell of the terminal in the grant-free scheduling state sends the resource releasing notification message. The network device releases the preconfigured resource in response to receiving the identity information of the original serving cell sent by the terminal in the grant-free scheduling state and the resource releasing notification message sent by the current serving cell of the terminal in the grant-free scheduling state. Therefore, the first condition in the disclosure may include the condition that the terminal in the grant-free scheduling state initiates random access and then accesses the serving cell and sends the setting information to the network device.

It can be understood that the terminal in the grant-free scheduling state in the disclosure refers to the terminal that performs data transmission by using the preconfigured resource allocated by the grant-free uplink scheduling. When the terminal in the grant-free scheduling state is in a disconnected state, and needs to transmit data, the data is transmitted at a specified transmission occasion on the resource preconfigured by the network device for the terminal.

Figure 8:
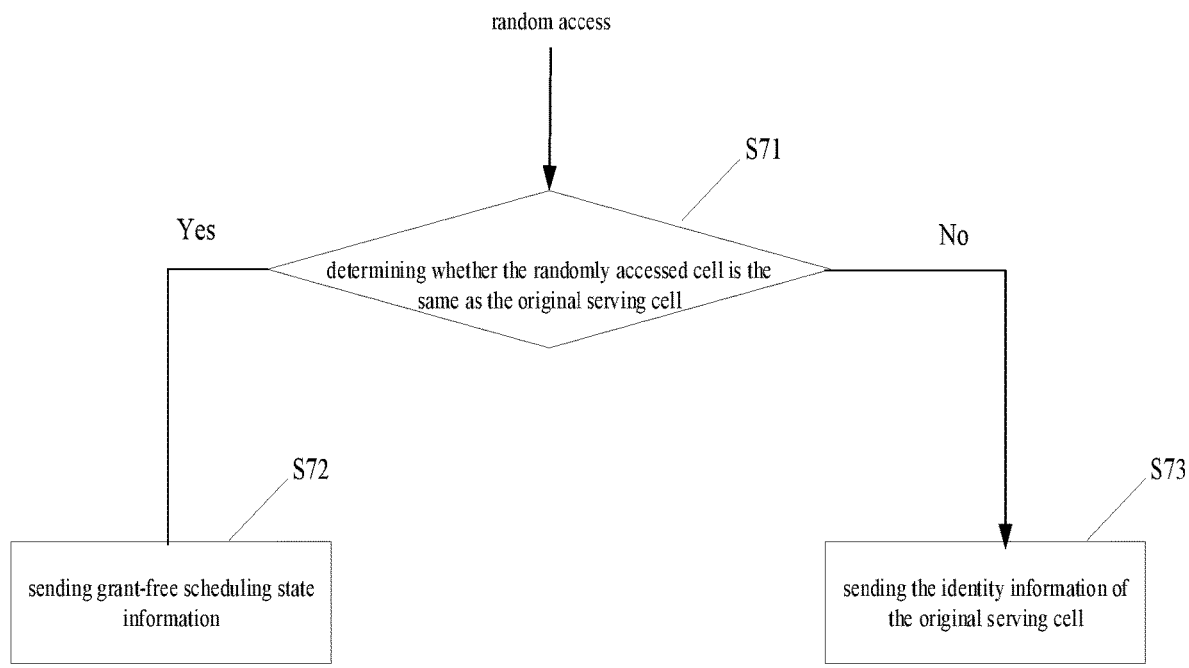
FIG. 8 is a flowchart of a method for controlling a preconfigured resource according to an exemplary embodiment.

FIG. 8 is a flowchart of a method for data transmission according to an exemplary embodiment. As shown in FIG. 8, the method for data transmission is applied to a terminal, and the method includes the following steps.

In step S71, random access is initiated for channel quality change, and it is determined whether the randomly accessed cell is the same as the original serving cell.

In step S72, the grant-free scheduling state information is sent by the terminal in the grant-free scheduling state in response to that the randomly accessed cell is the same as the original serving cell.

In step S73, the identity information of the original serving cell is sent by the terminal in the grant-free scheduling state in response to that the randomly accessed cell is different from the original serving cell.

Figure 9:
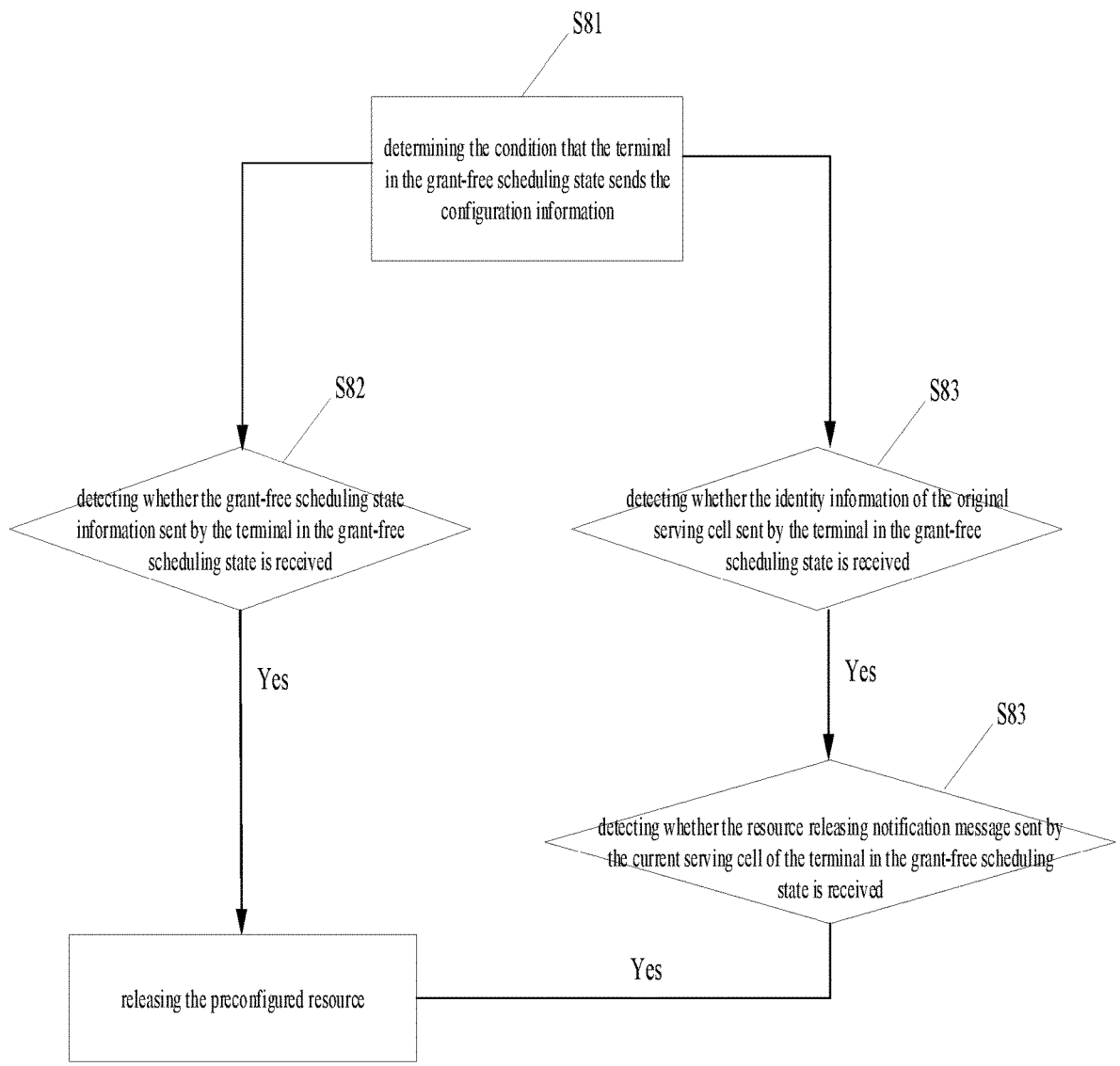
FIG. 9 is a flowchart of a method for data transmission according to an exemplary embodiment.

FIG. 9 is a flowchart of a method for controlling a preconfigured resource according to an exemplary embodiment. As shown in FIG. 9, the method for controlling a preconfigured resource is applied to a network device, and the method includes the following steps.

In step S81, the condition that the terminal in the grant-free scheduling state sends the configuration information is determined.

If the condition that the terminal in the grant-free scheduling state sends the configuration information includes: the cell randomly accessed by the terminal in the grant-free scheduling state is the same as the original serving cell, and the terminal in the grant-free scheduling state sends the grant-free scheduling state information, step S82 is executed. If the condition that the terminal in the grant-free scheduling state sends the configuration information includes the cell randomly accessed by the terminal in the grant-free scheduling state is different from the original serving cell, the terminal in the grant-free scheduling state sends the identity information of the original serving cell, and the current serving cell of the terminal in the grant-free scheduling state sends the resource releasing notification message, step S83 is executed.

In step S82, the grant-free scheduling state information sent by the terminal in the grant-free scheduling state is detected, and the preconfigured resource is released in response to receiving the grant-free scheduling state information sent by the terminal in the grant-free scheduling state.

In step S83, the identity information of the original serving cell sent by the terminal in the grant-free scheduling state is detected. If the identity information of the original serving cell sent by the terminal in the grant-free scheduling state is received, the resource releasing notification message sent by the current serving cell of the terminal in the grant-free scheduling state is detected. If the resource releasing notification message sent by the current serving cell of the terminal in the grant-free scheduling state is received, the preconfigured resource is released.

It can be understood that in the disclosure, after the terminal in the grant-free scheduling state randomly accesses the network, the network device can release the resource preconfigured for the terminal in the original serving cell based on the setting information reported by the terminal, to save power.

In the disclosure, the network device can clarify the reason why the terminal skips transmission, by clearly specifying the condition that the network device releases the preconfigured resource, such as the maximum number of consecutive transmission occasions the terminal is allowed to skip, or the condition that the terminal initiates random access for link failure, or the condition that the terminal in the grant-free scheduling state sends the configuration information, thereby accurately realizing the control of reserving or releasing the preconfigured resource.

It can be understood that, in the disclosure, the terminal and the network device may perform mutually interactive operations, in order to implement the method for controlling the preconfigured resource and the method for data transmission. For the execution process of the interaction between the terminal and the network device, reference may be made to the relevant descriptions of the foregoing embodiments, and details are not described herein again.

Based on the same concept, embodiments of the disclosure also provide an apparatus for controlling a preconfigured resource and an apparatus for data transmission.

It can be understood that, in order to implement the above functions, the apparatus for controlling a preconfigured resource and the apparatus for data transmission provided by the embodiments of the disclosure include hardware structures and/or software modules corresponding to respective functions. Combining with the units and algorithm steps of each example disclosed in the embodiments of the disclosure, the embodiments of the disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the disclosure.

Figure 10:
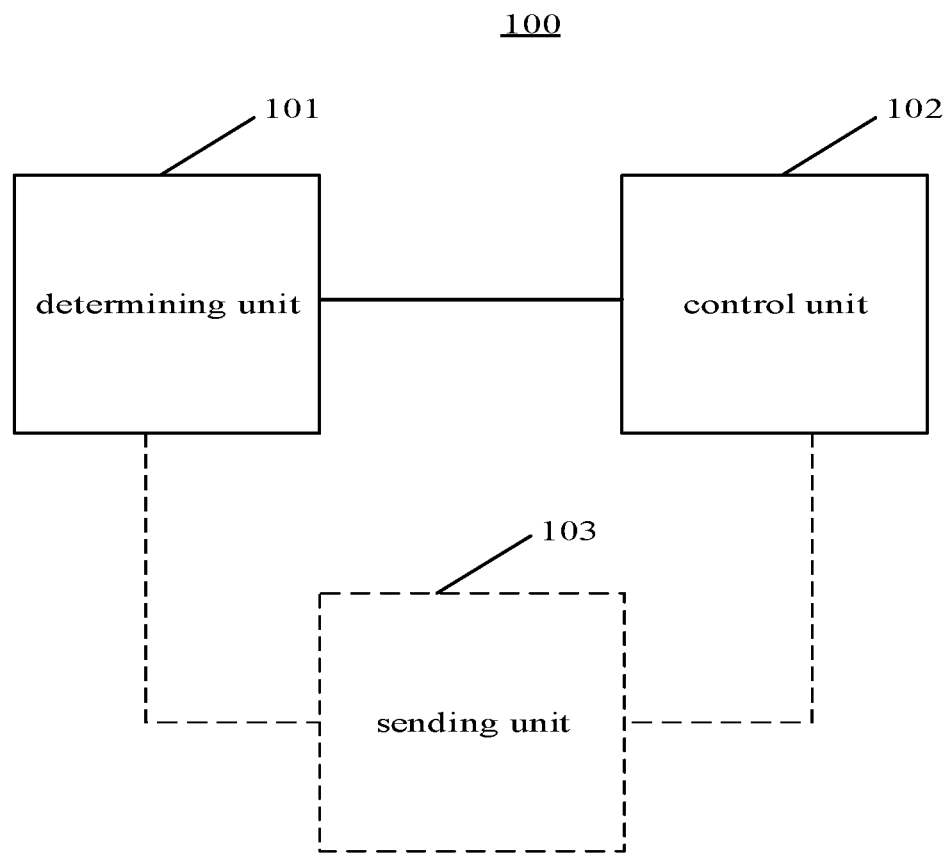
FIG. 10 is a block diagram of an apparatus for controlling a preconfigured resource according to an exemplary embodiment.

FIG. 10 is a block diagram of an apparatus for controlling a preconfigured resource according to an exemplary embodiment. As shown in FIG. 10, the apparatus 100 is applied to a network device, and the apparatus includes a determining unit 101 and a control unit 102.

The determining unit 101 is configured to determine a first condition, in which the first condition includes a maximum number of consecutive transmission occasions that a terminal is allowed to skip, a condition that a terminal initiates random access for link failure, or a condition that a terminal in a grant-free scheduling state sends configuration information.

The control unit 102 is configured to reserve or release a preconfigured resource according to the first condition.

When the terminal in the grant-free scheduling state is in a disconnected state and needs to transmit data, the data is transmitted at a specified transmission occasion on the resource preconfigured by the network device for the terminal.

In an implementation, the first condition includes the maximum number of consecutive transmission occasions that the terminal is allowed to skip.

The control unit 102 is configured to reserve or release the preconfigured resource according to the first condition by:
detecting predetermined information sent by the terminal; reserving the preconfigured resource in response to detecting the predetermined information sent by the terminal after the terminal skips no more than N consecutive transmission occasions; releasing the preconfigured resource in response to not detecting the predetermined information sent by the terminal during N consecutive transmission occasions; in which, N is the maximum number of consecutive transmission occasions that the terminal is allowed to skip.

In another implementation, the apparatus 100 further includes a sending unit 103. The sending unit 103 is configured to: send the first condition, the first condition including the maximum number of consecutive transmission occasions that the terminal is allowed to skip.

In yet another implementation, the first condition includes the condition that the terminal initiates random access for link failure, and the condition that the terminal initiates random access for link failure includes initiating random access by the terminal in response to receiving no negative acknowledgement feedback and/or retransmission resource.

The control unit 102 is configured to: release the preconfigured resource in response to not detecting the data sent by the terminal on the retransmission resource; and reserve the preconfigured resource in response to detecting the data sent by the terminal on the retransmission resource.

In yet another implementation, the first condition includes the condition that the terminal initiates random access for link failure, and the condition that the terminal initiates random access for link failure includes initiating random access in response to that the terminal receives negative acknowledgement feedback and retransmission resource, and retransmission of data fails on M consecutive retransmission resources, where M is a positive integer.

The control unit 102 is configured to: release the preconfigured resource in response to determining that the terminal fails to retransmit data on the M consecutive retransmission resources; and reserve the preconfigured resource in response to detecting the data sent by the terminal on the retransmission resource.

In yet another implementation, the first condition includes the condition that the terminal in the grant-free scheduling state sends the configuration information, and the condition that the terminal in the grant-free scheduling state sends the configuration information includes: a cell randomly accessed by the terminal in the grant-free scheduling state is the same as an original serving cell, and the terminal in the grant-free scheduling state sends grant-free scheduling state information.

The control unit 102 is configured to: release the preconfigured resource in response to receiving the grant-free scheduling state information sent by the terminal in the grant-free scheduling state.

In yet another implementation, the first condition includes the condition that the terminal in the grant-free scheduling state sends the configuration information, and the condition that the terminal in the grant-free scheduling state sends the configuration information includes: a cell randomly accessed by the terminal in the grant-free scheduling state is different from an original serving cell, the terminal in the grant-free scheduling state sends identity information of the original serving cell, and a current serving cell of the terminal in the grant-free scheduling state sends a resource releasing notification message.

The control unit 102 is configured to: release the preconfigured resource in response to receiving the identity information of the original serving cell sent by the terminal in the grant-free scheduling state and the resource releasing notification message sent by the current serving cell of the terminal in the grant-free scheduling state.

Figure 11:
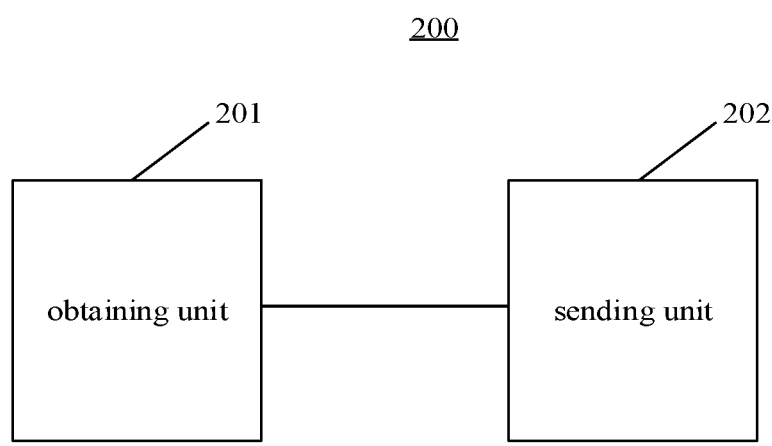
FIG. 11 is a block diagram of an apparatus for data transmission according to an exemplary embodiment.

FIG. 11 is a block diagram of an apparatus for data transmission according to an exemplary embodiment. As shown in FIG. 11, the apparatus 200 is applied to a terminal, and the apparatus 200 includes an obtaining unit 201 and a sending unit 202.

The obtaining unit 201 is configured to determine a first condition, in which the first condition includes a maximum number of consecutive transmission occasions that a terminal is allowed to skip, a condition that a terminal initiates random access for link failure, or a condition that a terminal in a grant-free scheduling state sends configuration information. The sending unit 202 is configured to transmit data according to the first condition.

When the terminal in the grant-free scheduling state is in a disconnected state and needs to transmit data, the data is transmitted at a specified transmission occasion on a resource preconfigured by a network device for the terminal.

In an implementation, the first condition includes the maximum number of consecutive transmission occasions that the terminal is allowed to skip.

The sending unit 202 is configured to send predetermined information to the network device after skipping N consecutive transmission occasions on a preconfigured resource, wherein N is the maximum number of consecutive transmission occasions that the terminal is allowed to skip.

The maximum number of consecutive transmission occasions that the terminal is allowed to skip is predefined or determined based on a high layer signaling.

In another implementation, the first condition includes the condition that the terminal initiate random access for link failure, and the condition that the terminal initiates random access for link failure includes initiating random access by the terminal in response to receiving no negative acknowledgement feedback and/or retransmission resource.

The sending unit 202 is configured to initiate random access in response to receiving no hybrid automatic repeat request (HARM) feedback and/or retransmission resource configuration.

In another implementation, the first condition includes the condition that the terminal initiates random access for link failure, and the condition that the terminal initiates random access for link failure includes initiating random access in response to that the terminal receives negative acknowledgement feedback and retransmission resource, and retransmission of data fails on the M consecutive retransmission resources, where M is a positive integer.

The sending unit 202 is configured to initiate random access in response to retransmission failure of data on the M consecutive retransmission resources.

In yet another implementation, the first condition includes the condition that the terminal in the grant-free scheduling state sends the configuration information, and the condition that the terminal in the grant-free scheduling state sends the configuration information includes: a cell randomly accessed by the terminal in the grant-free scheduling state is the same as an original serving cell, and the terminal in the grant-free scheduling state sends grant-free scheduling state information.

The sending unit 202 is configured to send the grant-free scheduling state information in response to that the randomly accessed cell is the same as the original serving cell.

In yet another implementation, the condition that the terminal in the grant-free scheduling state sends the configuration information includes: a cell randomly accessed by the terminal in the grant-free scheduling state is different from an original serving cell, the terminal in the grant-free scheduling state sends the identity information of the original serving cell, and the current serving cell of the terminal in the grant-free scheduling state sends the resource releasing notification message.

The sending unit 202 is configured to send the identity information of the original serving cell in response to that the randomly accessed cell is different from the original serving cell.

Regarding the apparatus in the above embodiments, the specific manner in which each module performs operations has been described in detail in the embodiments of the method, and will not be described in detail here.

Figure 12:
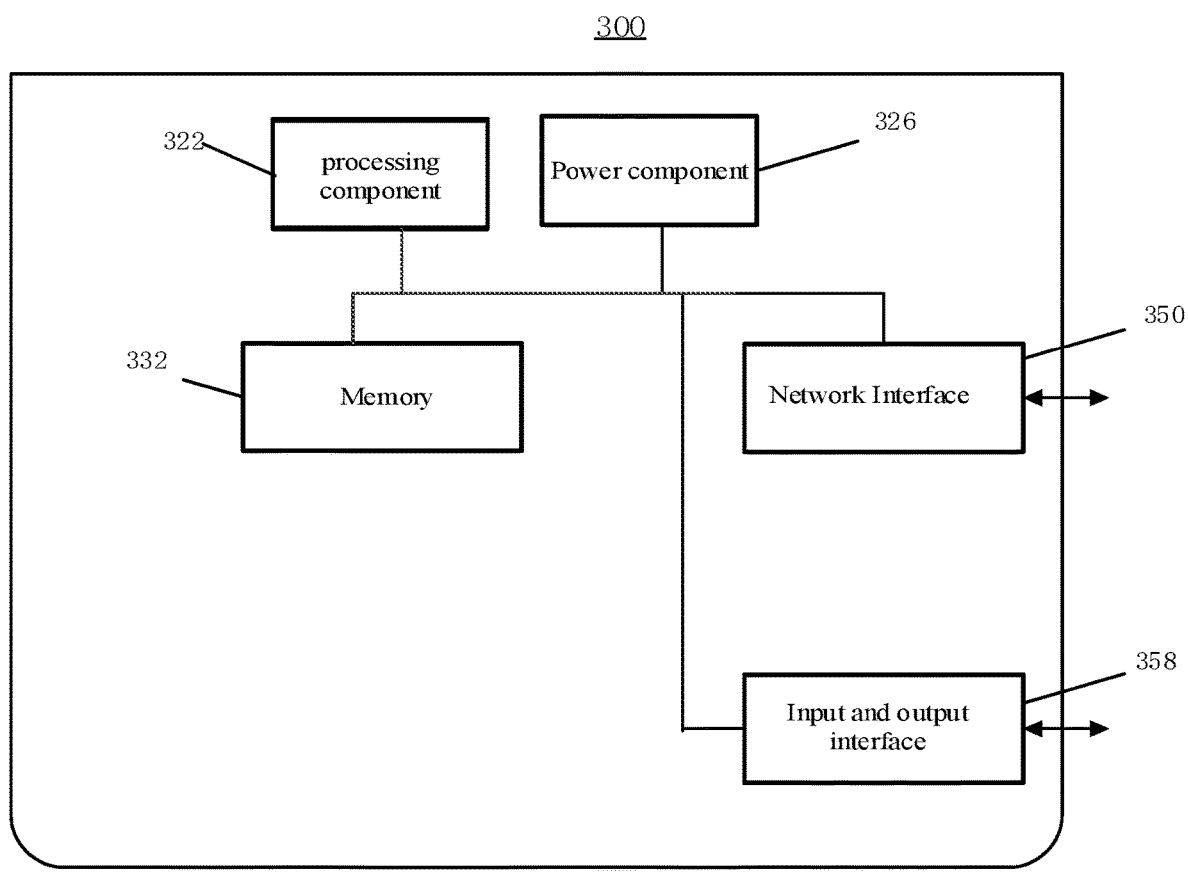
FIG. 12 is a block diagram of an apparatus for controlling a preconfigured resource according to an exemplary embodiment.

FIG. 12 is a block diagram of an apparatus 300 for controlling a preconfigured resource according to an exemplary embodiment. For example, the apparatus 300 may be provided as a network device. As shown in FIG. 12, the apparatus 300 includes a processing component 322, which further includes one or more processors, and a memory resource represented by memory 332, for storing instructions executable by the processing component 322, such as application programs. The application programs stored in the memory 332 may include one or more modules, each corresponding to a set of instructions. In addition, the processing component 322 is configured to execute instructions to perform the above method.

The apparatus 300 may also include a power component 326 configured to perform power management of the apparatus 300, a wired or wireless network interface 350 configured to connect the apparatus 300 to a network, and an input/output (I/O) interface 358. The apparatus 300 may operate based on an operating system stored in memory 332, such as Windows Server™, Mac OS X™, Unix™, Linux™, FreeBSD™ or the like.

Figure 13:
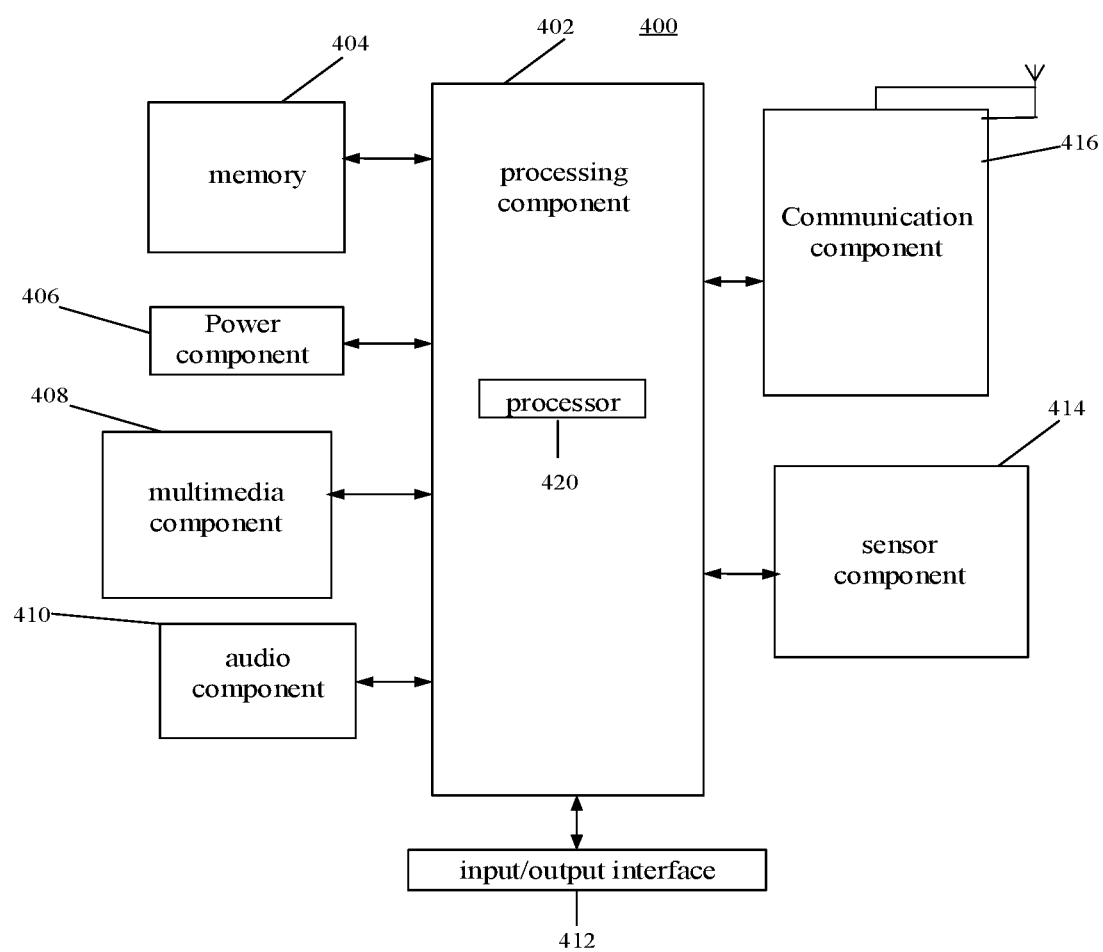
FIG. 13 is a block diagram of an apparatus for data transmission according to an exemplary embodiment.

FIG. 13 is a schematic diagram of an apparatus 400 for data transmission according to an embodiment of the disclosure. For example, the apparatus 400 may be a mobile phone, a computer, a digital broadcasting terminal, a message transceiver device, a game console, a tablet device, a medical device, a fitness device and a personal digital assistant.

As illustrated in FIG. 13, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 generally controls overall operation of the apparatus 400, such as the operations associated with display, telephone calls, data communications, camera operations, and recording operations. The processing component 402 may include one or more processors 420 to execute instructions to perform all or part of the steps in the above described method. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front-facing camera and/or a rear-facing camera. When the apparatus 400 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 410 is configured to output and/or input audio signals. For example, the audio component 410 includes a microphone (MIC) configured to receive an external audio signal when the apparatus 400 is in an operation mode, such as a call mode, a recording mode, and a voice recognition mode. The received audio signal may be further stored in the memory 804 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For instance, the sensor component 414 may detect an open/closed status of the apparatus 400, relative positioning of components, e.g., the display and the keypad, of the apparatus 400, a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G, or 3G, or a combination thereof. In an exemplary embodiment, the communication component 416 receives a broadcast signal or broadcast associated information from an external broadcast management system via a broadcast channel. In an exemplary embodiment, the communication component 416 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 404, executable by the processor 420 in the apparatus 400, for performing the above method. For example, the non-transitory computer-readable storage medium may be a ROM, a RAM, a CD-ROM, a magnetic tape, a floppy disc, an optical data storage device, and the like.

It should be understood that "multiple" mentioned in the disclosure refers to one or more, and other quantifiers are similar. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first" and "second" are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as the first information.

It is understood that, although the operations are described in a specific order in the drawings in the embodiments of the disclosure, the operations do not need to be performed in the specific order shown or in a serial order, or are required to be performed to get a desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

includes initiating random access by the terminal in response to receiving no negative acknowledgement feedback and/or retransmission resource.

The sending unit 202 is configured to initiate random access in response to receiving no hybrid automatic repeat request (HARM) feedback and/or retransmission resource configuration.

In another implementation, the first condition includes the condition that the terminal initiates random access for link failure, and the condition that the terminal initiates random access for link failure includes initiating random access in response to that the terminal receives negative acknowledgement feedback and retransmission resource, and retransmission of data fails on the M consecutive retransmission resources, where M is a positive integer.

The sending unit 202 is configured to initiate random access in response to retransmission failure of data on the M consecutive retransmission resources.

In yet another implementation, the first condition includes the condition that the terminal in the grant-free scheduling state sends the configuration information, and the condition that the terminal in the grant-free scheduling state sends the configuration information includes: a cell randomly accessed by the terminal in the grant-free scheduling state is the same as an original serving cell, and the terminal in the grant-free scheduling state sends grant-free scheduling state information.

The sending unit 202 is configured to send the grant-free scheduling state information in response to that the randomly accessed cell is the same as the original serving cell.

In yet another implementation, the condition that the terminal in the grant-free scheduling state sends the configuration information includes: a cell randomly accessed by the terminal in the grant-free scheduling state is different from an original serving cell, the terminal in the grant-free scheduling state sends the identity information of the original serving cell, and the current serving cell of the terminal in the grant-free scheduling state sends the resource releasing notification message.

The sending unit 202 is configured to send the identity information of the original serving cell in response to that the randomly accessed cell is different from the original serving cell.

Regarding the apparatus in the above embodiments, the specific manner in which each module performs operations has been described in detail in the embodiments of the method, and will not be described in detail here.

FIG. 12 is a block diagram of an apparatus 300 for controlling a preconfigured resource according to an exemplary embodiment. For example, the apparatus 300 may be provided as a network device. As shown in FIG. 12, the apparatus 300 includes a processing component 322, which further includes one or more processors, and a memory resource represented by memory 332, for storing instructions executable by the processing component 322, such as application programs. The application programs stored in the memory 332 may include one or more modules, each corresponding to a set of instructions. In addition, the processing component 322 is configured to execute instructions to perform the above method.

The apparatus 300 may also include a power component 326 configured to perform power management of the apparatus 300, a wired or wireless network interface 350 configured to connect the apparatus 300 to a network, and an input/output (I/O) interface 358. The apparatus 300 may operate based on an operating system stored in memory 332, such as Windows Server™, Mac OS X™, Unix™, Linux™, FreeBSD™ or the like.

FIG. 13 is a schematic diagram of an apparatus 400 for data transmission according to an embodiment of the disclosure. For example, the apparatus 400 may be a mobile phone, a computer, a digital broadcasting terminal, a message transceiver device, a game console, a tablet device, a medical device, a fitness device and a personal digital assistant.

As illustrated in FIG. 13, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 generally controls overall operation of the apparatus 400, such as the operations associated with display, telephone calls, data communications, camera operations, and recording operations. The processing component 402 may include one or more processors 420 to execute instructions to perform all or part of the steps in the above described method. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front-facing camera and/or a rear-facing camera. When the apparatus 400 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 410 is configured to output and/or input audio signals. For example, the audio component 410 includes a microphone (MIC) configured to receive an external audio signal when the apparatus 400 is in an operation mode, such as a call mode, a recording mode, and a voice recognition mode. The received audio signal may be further stored in the memory 804 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For instance, the sensor component 414 may detect an open/closed status of the apparatus 400, relative positioning of components, e.g., the display and the keypad, of the apparatus 400, a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G, or 3G, or a combination thereof. In an exemplary embodiment, the communication component 416 receives a broadcast signal or broadcast associated information from an external broadcast management system via a broadcast channel. In an exemplary embodiment, the communication component 416 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 404, executable by the processor 420 in the apparatus 400, for performing the above method. For example, the non-transitory computer-readable storage medium may be a ROM, a RAM, a CD-ROM, a magnetic tape, a floppy disc, an optical data storage device, and the like.

It should be understood that "multiple" mentioned in the disclosure refers to one or more, and other quantifiers are similar. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first" and "second" are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as the first information.

It is understood that, although the operations are described in a specific order in the drawings in the embodiments of the disclosure, the operations do not need to be performed in the specific order shown or in a serial order, or are required to be performed to get a desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a preconfigured resource, applied to a network device, comprising:
   determining a first condition, wherein the first condition comprises a condition that a terminal in a grant-free scheduling state sends configuration information;
   reserving or releasing a preconfigured resource according to the first condition;
   wherein, when the terminal is in a grant-free scheduling state and also in a disconnected state and needs to transmit data, the data is transmitted at a specified transmission occasion on the resource preconfigured by the network device for the terminal;
   wherein the condition that the terminal in the grant-free scheduling state sends the configuration information comprises: a cell randomly accessed by the terminal in the grant-free scheduling state is the same as an original serving cell, and the terminal in the grant-free scheduling state sends grant-free scheduling state information; and
   wherein releasing the preconfigured resource according to the first condition comprises:
   releasing the preconfigured resource in response to receiving the grant-free scheduling state information sent by the terminal in the grant-free scheduling state.

2. The method according to claim 1, wherein the terminal is a Narrow band Internet of thing (NB-IoT) terminal.

3. A method for data transmission, applied to a terminal, comprising:
   determining a first condition, wherein the first condition comprises a condition that a terminal in a grant-free scheduling state sends configuration information; and
   transmitting data according to the first condition;
   wherein, when the terminal is in a grant-free scheduling state and also in a disconnected state and needs to transmit data, the data is transmitted at a specified transmission occasion on the resource preconfigured by the network device for the terminal;
   wherein the condition that the terminal in the grant-free scheduling state sends the configuration information comprises: a cell randomly accessed by the terminal in the grant-free scheduling state is the same as an original serving cell, and the terminal in the grant-free scheduling state sends grant-free scheduling state information; and
   wherein transmitting data according to the first condition comprises:
   sending the grant-free scheduling state information in response to a determination that the randomly accessed cell is the same as the original serving cell.

4. The method according to claim 3, wherein a maximum number of consecutive transmission occasions that the terminal is allowed to skip is predefined or determined based on a high layer signaling.

5. The method according to claim 3, wherein the terminal is a Narrow band Internet of thing (NB-IoT) terminal.

6. A network device, comprising:
   a processor; and
   a memory configured to store instructions executable by a processor; wherein,
   the processor is configured to implement the method for controlling a preconfigured resource according to claim 1.

7. A terminal, comprising:
   a processor; and
   a memory configured to store instructions executable by a processor; wherein,
   the processor is configured to:
   determine a first condition, wherein the first condition comprises a condition that a terminal in a grant-free scheduling state sends configuration information; and
   transmit data according to the first condition;
   wherein, when the terminal in a grant-free scheduling state and also in a disconnected state and needs to transmit data, the data is transmitted at a specified transmission occasion on the resource preconfigured by the network device for the terminal;
   wherein the condition that the terminal in the grant-free scheduling state sends the configuration information comprises: a cell randomly accessed by the terminal in the grant-free scheduling state is the same as an original serving cell, and the terminal in the grant-free scheduling state sends grant-free scheduling state information; and
   wherein transmitting data according to the first condition comprises:
   sending the grant-free scheduling state information in response to a determination that the randomly accessed cell is the same as the original serving cell.

8. The terminal according to claim 7, wherein the terminal is a Narrow band Internet of thing (NB-IoT) terminal.

* * * * *